Oct. 1, 1929.   D. B. TOLLEY   1,729,912
POULTRY FOUNTAIN OR FEEDER
Filed Sept. 26, 1928   2 Sheets-Sheet 2
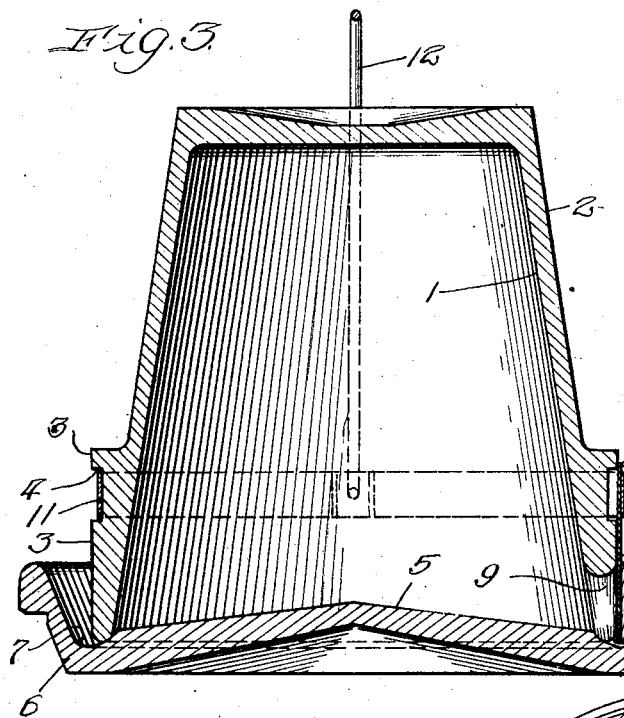
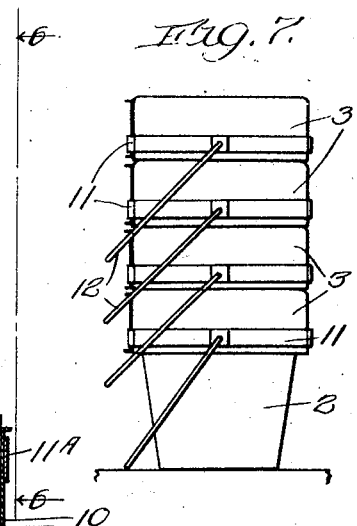
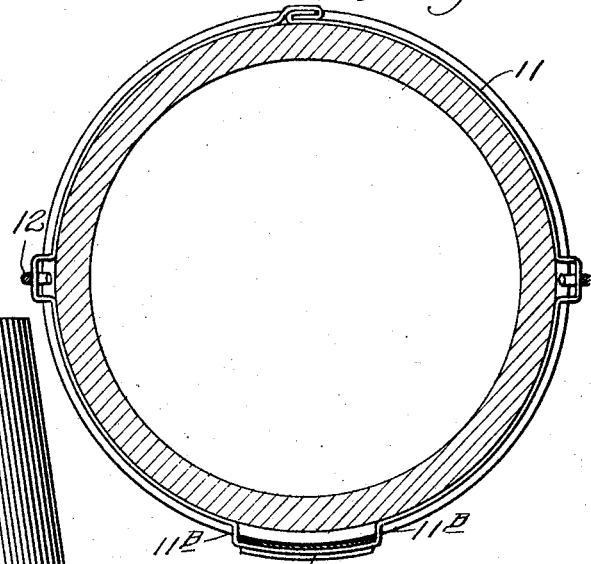
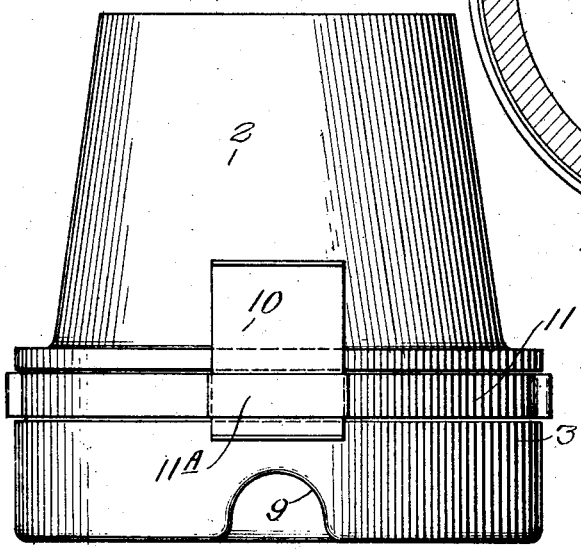
Inventor:
Donald B. Tolley
by Albert Scheible Patented Oct. 1, 1929

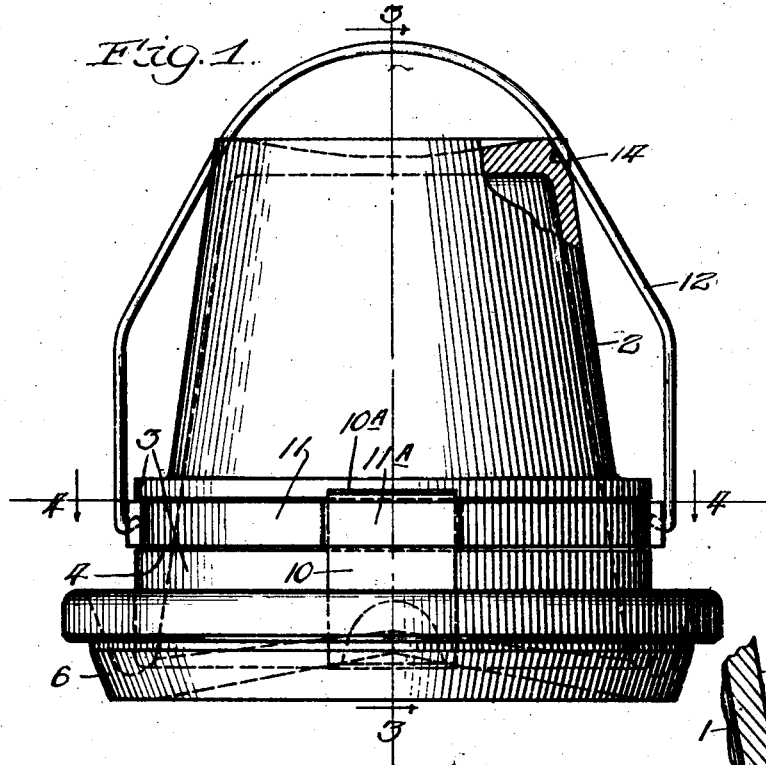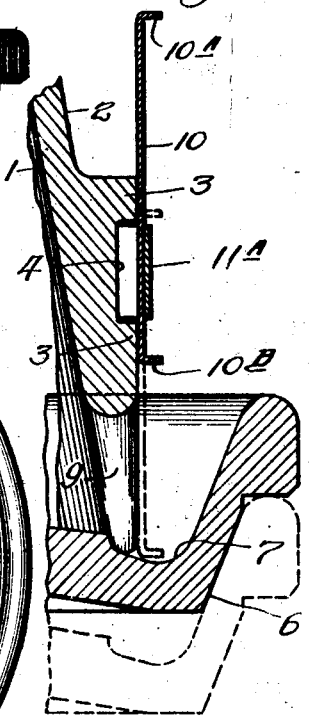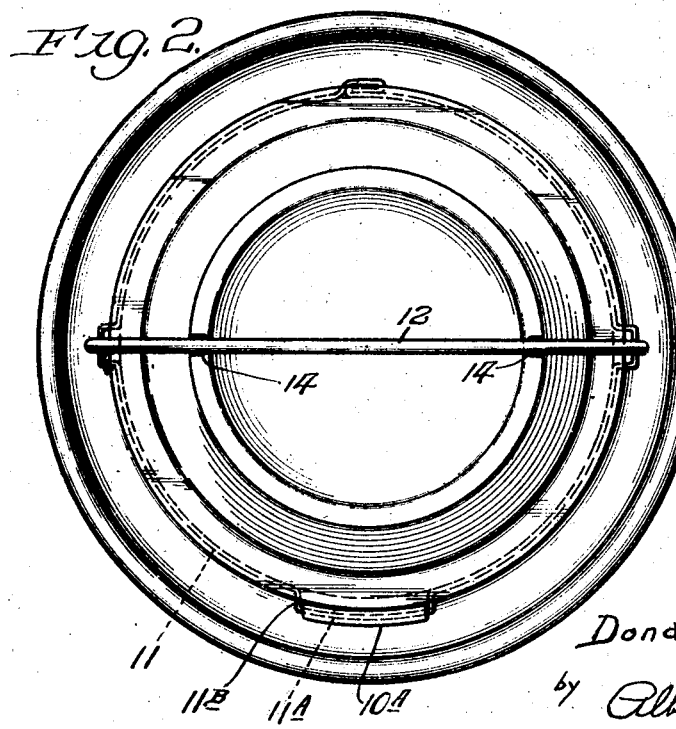

1,729,912

UNITED STATES PATENT OFFICE

DONALD B. TOLLEY, OF MACOMB, ILLINOIS, ASSIGNOR TO AMERICAN STEEL PRODUCTS CO., OF MACOMB, ILLINOIS, A CORPORATION OF ILLINOIS

POULTRY FOUNTAIN OR FEEDER

Application filed September 26, 1928. Serial No. 308,425.

My invention relates to poultry feeders of the class in which the feed flows from an inverted container into a trough disposed outward of the container, and in its general objects aims to provide an inexpensive and easily manufactured poultry feeder having the following desirable characteristics:

(1) A construction which will readily permit a separate nesting of the containers and of the pan portions of the feeder, so as to decrease the size of the packages and reduce transportation expenses.

(2) A centering of the inverted container on the pan, so as to afford a feed trough of substantially uniform width around the container.

(3) A simple, adjustable and easily manipulated gate for controlling the discharge of the feed into the feed trough.

(4) Simple means for latching the gate in any adjusted position, and for limiting the movement of the gate.

(5) A secure and advantageously positioned attaching of a carrying bale to the container, arranged so as not to interfere with the nesting of the containers.

(6) Simple and effective means for normally latching the bale in a position in which it does not obstruct access to the trough.

(7) A simple and unitary mounting for the gate and the bale.

Still further and also more detailed objects will appear from the following specification and from the accompanying drawings, in which—

Fig. 1 is a front elevation of a poultry feeder embodying my invention, with a portion of the closed end of the container broken away.

Fig. 2 is a plan view of this feeder.

Fig. 3 is a central and vertical section through the same, taken along the line 3—3 of Fig. 1.

Fig. 4 is a horizontal section through Fig. 1 along the line 4—4 of that figure.

Fig. 5 is an enlargement of the lower right-hand portion of Fig. 1, showing the gate raised and with dotted lines showing the gate in its closure position.

Fig. 6 is a side elevation of the container with the strap and the feed gate fitted to it, taken from the right-hand side of Fig. 1 before the bale is attached to the strap.

Fig. 7 is a reduced elevation showing the nesting of the containers.

In the illustrated embodiment, the container of my feeder has the general shape of a flowerpot, with its inner wall 1 and its outer wall 2 of counterpart conical shape, and with the outer conical wall 2 leading to a larger diametered cylindrical outer wall portion 3 at the mouth of the container, this cylindrical wall portion being interrupted at some distance from the mouth of the container by a circumferential groove 4. The companion member of my feeder is a pan having its bottom formed to afford a slightly conical central upper face portion 5 spaced from the peripheral wall 6 of the pan by an annular and upwardly open groove 7. The inner wall of this groove 7 is of such a size that the mouth end of the inverted container will substantially fit over it as shown in Fig. 5; and the width of the groove is considerably greater than the thickness of the mouth end of the container, so that the radially outer portion of the groove forms the bottom of an annular feed trough, of which trough the riser wall of the pan and the mouth end of the container respectively form the outer and inner walls.

The container has at or adjacent to its mouth a discharge outlet, desirably in the form of a recess 9 opening at the mouth of the container through which discharge outlet the feed can gradually flow from the container into the said feed trough. The discharge outlet is so disposed in the container that it is somewhat below the top of the pan wall 6 when the feeder is assembled, and the flow of feed through this outlet is controlled by a gate 10 which is movable to and from a position in which it effectively closes the outlet.

As a simple and effective guide and mounting for this gate, I provide a strap 11 which has its major portion housed by the peripheral groove 4 in the container and which has an outwardly offset guide portion 11A overhanging the discharge outlet, the strap being drawn snug around the bottom of the said groove 4 to prevent the strap from shifting rotationally of the container. The offset guide portion 11A of the strap has an interior width slightly greater than the width of the gate 10, so that the ends 11B of this guide will restrict the gate to a vertical movement. These guide ends project radially of the feeder beyond the cylindrical exterior portion 3 of the container to such a limited extent (as shown in Fig. 8) that the generally flat gate 10 is slightly bowed by pressure against the container, whereby the guide is cramped sufficiently to hold it in any position to which it has been slid, and the sliding of the gate is limited by stop flanges 10A and 10B formed respectively at the upper and lower ends of the gate and each adapted to engage the guide. Moreover, the height of the gate is preferably not in excess of the height of the cylindrical container wall portion, so that the gates when in their closure positions will not interfere with the nesting of the containers after the manner of Fig. 7.

As means for lifting the container off the pan and for carrying the filled container, I provide a wire bale 12 having recurved ends hooked through apertures in two diametrically opposite ears 13 which also are formed in the strap 10 and offset outwardly, these ears being desirably spaced about 90 degrees circumferentially of the strap from the middle of the guide 11. The bale 12 is preferably of resilient wire and the closed end of the container has at its edge a pair of diametrically opposite recesses 14 into which the bale snaps when swung to its position of Fig. 1, but from which recesses the bale can be released by springing the shanks of the bale slightly away from each other.

With feeders thus constructed, the pans (which may be of ordinary earthenware) can be nested as indicated in dotted lines in Fig. 5. The containers (which may likewise be of earthenware) can also been nested separately as shown in Fig. 7, since the gates (when of less height than the cylindrical outer wall portion 3) will not interfere with the nesting, while the bales on the higher containers can extend partly over relatively lower containers.

When the feeder is to be used, the container can be carried (mouth upward) by the bale and filled with the gate slid into its outlet-closing position. The pan is then inverted and set down over the upwardly open filled container, in doing which the inner wall of the groove 7 enters the mouth of the container to center the pan on the container, thereby effectively sealing the container which can then be inverted along with the pan without spilling any of the contents. The erected feeder is then set on the ground or floor and the gate 10 is raised according to the desired rate of flow, whereupon gravity and outside air pressure will cooperate to maintain the level of the feed in the trough at a height corresponding to the bottom of the gate (or to the top of the discharge outlet in case the gate is raised above this top).

Since both the container and the pan can easily be formed of cheap clayey material, and since the metal parts (namely the strap, gate and bale) are also cheaply manufactured, the entire cost of the feeder parts is quite low, and the assembling of the metal parts on the containers adds but little to the cost. So also by using counterpart tapers for the main inner and outer wall portions of the containers and likewise of the pans, I permit a separate and compact nesting of the containers and of the pans for quantity shipments, thereby reducing the costs of packing and of transportation.

However, while I have heretofore described by invention in an embodiment including desirable details of construction and arrangement, I do not wish to be limited in these respects, since changes might be made without departing either from the spirit of my invention or from the appended claims. Nor do I wish to be limited to the use of any particular materials for the constituent parts.

I claim as my invention:

1. A poultry feeder comprising a pan, a downwardly open container having an opening adjacent to its mouth, a strap encircling the container above the opening, and a gate supported by the container adjacent to the said opening and adapted to close the opening when the gate is lowered; the gate being guided for vertical movement by the strap, and held against movement circumferentially of the container by the strap.

2. A poultry feeder comprising a pan, a downwardly open container having an opening adjacent to its mouth, a strap encircling the container above the opening, and a vertically movable gate having its lateral edges guided by the strap, the gate being adapted to close the opening when the gate is lowered, the gate being frictionally gripped between the strap and the exterior of the container to hold the slide in any adjusted position.

3. A poultry feeder comprising a pan, a downwardly open container having an opening adjacent to its mouth, a strap encircling the container above the opening, a vertically movable gate guided by the strap and adapted to close the opening when the gate is lowered, and a resilient bale pivoted at its ends to the strap, the container having formations adjacent to its upper end for latching the bale in an upright position.

4. A poultry feeder comprising a pan, a downwardly open container having on opening adjacent to its mouth and a peripheral groove disposed above the opening, a strap having its major portion housed by the groove and having an offset portion in vertical alinement with the said opening, and a slide extending between the said offset portion and the exterior of the container, the slide being vertically movable and adapted when lowered to close the said openings.

5. A poultry feeder as per claim 4, in which the slide is frictionally gripped between the said offset portion of the strap and the exterior container portions above and below the groove, whereby the slide is frictionally held in any adjusted position.

6. A poultry feeder as per claim 4, in which the slide has two vertically spaced stop portions respectively underhanging the offset portion of the strap, the said stop portions being adapted to engage the strap for respectively limiting the raising and the lowering movement of the slide.

7. A poultry feeder as per claim 4, in which the strap also has two diametrically opposite and outwardly projecting formations rotationally displaced from the said offset formation, in combination with a bale having its ends hingedly connected respectively to the said outwardly projecting formations.

8. A poultry feeder comprising a pan, a downwardly open container normally seated in the pan, the mouth end of the container having a lateral discharge opening and the said mouth end being considerably smaller in diameter than the upper face of the bottom of the pan, the pan having formations on its said bottom for engaging container wall portions to center the container in the pan, a bale for lifting the container, a fastening member secured to the container, a movable door held in position by the fastening member and adapted in one position to close the discharge opening, and a bale having its ends hingedly connected to the fastening member.

Signed at Macomb, Illinois, September 19th, 1928.

DONALD B. TOLLEY.